United States Patent
Cho et al.

(10) Patent No.: US 9,207,488 B2
(45) Date of Patent: Dec. 8, 2015

(54) LIQUID CRYSTAL DISPLAY PANEL AND LIQUID CRYSTAL DISPLAY APPARATUS HAVING THE SAME

(71) Applicant: Samsung Display Co., Ltd., Yongin (KR)

(72) Inventors: Seon-Ah Cho, Busan (KR); Sang-Jae Kim, Seongnam-si (KR); Gwan-Young Na, Yongin-si (KR); Kwang-Hyun Kim, Gunpo-si (KR); Hyoung-Joo Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 29 days.

(21) Appl. No.: 14/282,818

(22) Filed: May 20, 2014

(65) Prior Publication Data
US 2015/0036082 A1    Feb. 5, 2015

(30) Foreign Application Priority Data

Jul. 30, 2013   (KR) ......................... 10-2013-0089959

(51) Int. Cl.
*G02F 1/1335* (2006.01)

(52) U.S. Cl.
CPC .... *G02F 1/133536* (2013.01); *G02F 1/133528* (2013.01)

(58) Field of Classification Search
CPC ..................... G02F 1/133528; G02F 1/133536
See application file for complete search history.

(56) References Cited

U.S. PATENT DOCUMENTS

| 8,035,774 B2 | 10/2011 | Ouderkirk et al. |
| 2009/0244445 A1 | 10/2009 | Nakamura et al. |

FOREIGN PATENT DOCUMENTS

| JP | 2988332 | 10/1999 |
| JP | 2011-248363 | 12/2011 |
| KR | 10-2010-0102292 | 9/2010 |
| KR | 10-2011-0096766 | 8/2011 |
| KR | 10-2012-0119525 | 10/2012 |
| KR | 10-2012-0138349 | 12/2012 |

*Primary Examiner* — Phu Vu
(74) *Attorney, Agent, or Firm* — H.C. Park & Associates, PLC

(57) ABSTRACT

A liquid crystal display panel includes a first substrate, a second substrate facing the first substrate, a liquid crystal layer disposed between the first substrate and the second substrate, a first polarizing element disposed under the first substrate, the first polarizing element including a first polarizing layer and a second polarizing layer having different refractive indexes, the first polarizing layer having been stretched in a direction substantially parallel to a transmitting axis of the first polarizing element, and a second polarizing element disposed on the second substrate, the second polarizing element having been stretched in a direction substantially perpendicular to a transmitting axis of the second polarizing element.

20 Claims, 2 Drawing Sheets

LIQUID CRYSTAL DISPLAY PANEL AND LIQUID CRYSTAL DISPLAY APPARATUS HAVING THE SAME

CROSS REFERENCE TO RELATED APPLICATION

This application claims priority from and the benefit of Korean Patent Application No. 10-2013-0089959, filed on Jul. 30, 2013, which is hereby incorporated by reference for all purposes as if fully set forth herein.

BACKGROUND

1. Field

Exemplary embodiments of the present invention relate to a liquid crystal display panel and a liquid crystal display apparatus including the liquid crystal display panel.

2. Discussion of the Background

A liquid crystal display ("LCD") apparatus is one of the most broadly used flat display apparatuses. In the liquid crystal display apparatus, a voltage is applied to liquid crystal molecules to adjust the arrangement of the liquid crystal molecules. Due to the arrangement of the liquid crystal molecules, optical characteristics of a liquid crystal cell such as birefringence, optical rotator power, dichroism and light scattering characteristic are adjusted to display an image.

Generally, the liquid crystal display panel includes two substrates and a liquid crystal layer disposed between the substrates. Liquid crystal material is injected between two substrates to form the liquid crystal layer. The liquid crystal display apparatus includes two polarizing elements disposed outside of two substrates. The polarizing elements may be at least one of a reflective polarizing element and an absorptive polarizing element to pass or absorb a light having a specific direction to display an image. The reflective polarizing element passes a light vibrating in a specific direction and reflects lights vibrating in other directions. The absorptive polarizing element passes a light vibrating in a specific direction and absorbs lights vibrating in other directions. However, use of increased number in kinds of polarizing elements included in the display apparatus tends to decrease the luminance of the display apparatus and increase the manufacturing cost of the display apparatus.

To increase the luminance of the display apparatus, an improved optical sheet is generally included in the liquid crystal display apparatus. The improved optical sheet may include a dual brightness enhancement film ("DBEF"). The dual brightness enhancement film may reuse a polarized component of the light which is reflected at the reflective polarizing element through a process called polarization recycling process, improving the optical efficiency of the liquid crystal display apparatus.

In spite of the above-mentioned merit, research has been done to find a method of enhancing the optical efficiency of the liquid crystal display apparatus without using the dual brightness enhancement film to lower the manufacturing cost. Thus, recently, a new reflective polarizing element employing a cholesteric liquid crystal ("CLC"), a wire grid polarizer ("WGP") or a birefringence optical fiber has been studied.

However, when a reflective polarizing element is used, the size and volume of the reflective polarizing element may be affected by the changes in the temperature and humidity, resulting in contortion of the display panel.

SUMMARY

Exemplary embodiments of the present invention provide a liquid crystal display panel including a reflective polarizing element which may prevent distortion of display panel from changes in the environment such as temperature and humidity.

Exemplary embodiments of the present invention also provide a liquid crystal display apparatus having the liquid crystal display panel.

Additional features of the invention will be set forth in the description which follows, and in part will be apparent from the description, or may be learned by practice of the invention.

An exemplary embodiment of the present invention discloses a liquid crystal display panel including; a first substrate, a second substrate facing the first substrate, a liquid crystal layer disposed between the first substrate and the second substrate, a first polarizing element disposed under the first substrate, the first polarizing element including a first polarizing layer and a second polarizing layer having different refractive indexes, the first polarizing layer having been stretched in a direction substantially parallel to a transmitting axis of the first polarizing element, and a second polarizing element disposed on the second substrate, the second polarizing element having been stretched in a direction substantially perpendicular to a transmitting axis of the second polarizing element.

An exemplary embodiment of the present invention also discloses a liquid crystal display apparatus including: a liquid crystal display panel including; a first substrate, a second substrate facing the first substrate, a liquid crystal layer disposed between the first substrate and the second substrate, a first polarizing element disposed under the first substrate, the first polarizing element including a first polarizing layer and a second polarizing layer having different refractive indexes, the first polarizing layer having been stretched in a direction substantially parallel to a transmitting axis of the first polarizing element, and a second polarizing element disposed on the second substrate, the second polarizing element having been stretched in a direction substantially perpendicular to a transmitting axis of the second polarizing element; and a backlight assembly configured to provide a light to the liquid crystal display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
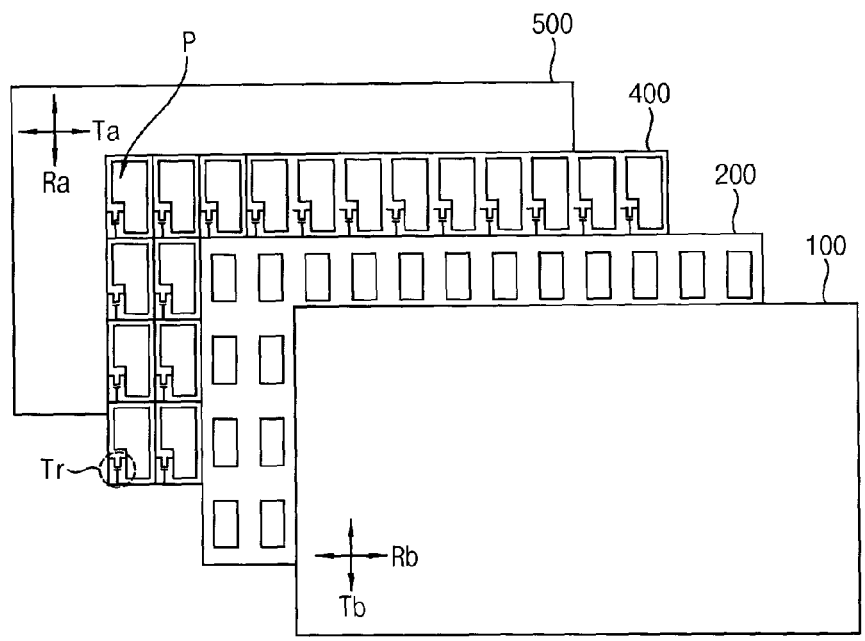
FIG. 1 is a plan view illustrating a liquid crystal display panel according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
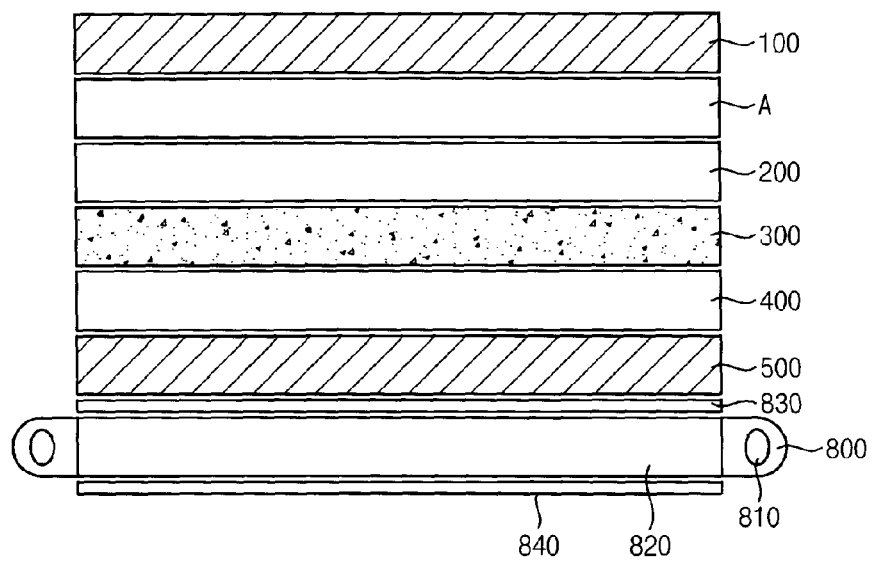
FIG. 2 is a cross-sectional view illustrating a liquid crystal display apparatus including the liquid crystal display panel of FIG. 1.
Figure 3:
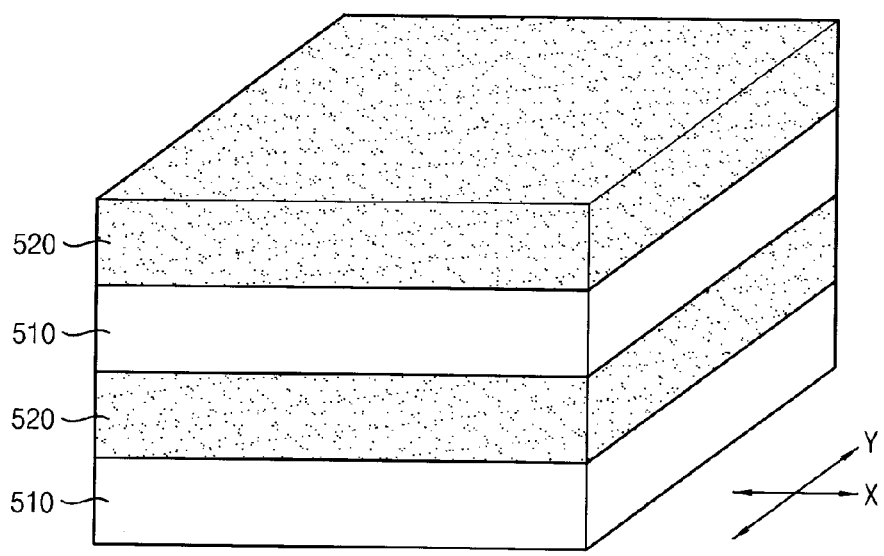
FIG. 3 is a perspective view illustrating a first polarizing element included in the liquid crystal display panel of FIG. 1.

FIG. 1 is a plan view illustrating a liquid crystal display panel according to an exemplary embodiment of the present invention. FIG. 2 is a cross-sectional view illustrating a liquid crystal display apparatus including the liquid crystal display panel of FIG. 1. FIG. 3 is a perspective view illustrating a first polarizing element included in the liquid crystal display panel of FIG. 1.

Referring to FIGS. 1 to 3, the liquid crystal display apparatus includes a second polarizing element 100, a second substrate 200, a liquid crystal layer 300, a first substrate 400, a first polarizing element 500, an optical sheet 830, and a backlight assembly 800.

The first substrate 400 and the second substrate 200 are transparent insulating substrates. For example, the first substrate 400 and the second substrate 200 may be made of glass substrates and plastic substrates. The first substrate 400 and the second substrate 200 may face each other. The first substrate 400 may be a thin film transistor substrate including a plurality of thin film transistors ("TFT") Tr disposed in a matrix form. The first substrate 400 may further include a plurality of gate lines and a plurality of data lines connected to the thin film transistors Tr.

The second substrate 200 may be a color filter substrate including a color filter to express a color by filtering the light provided from the backlight assembly 800. For example, the second substrate 200 may include a first color filter, a second color filter and a third color filter. More specifically, the first color filter may be a red color filter; the second color filter may be a green color filter; and the third color filter may be a blue color filter. The second substrate 200 may further include a black matrix disposed between the color filters. In another exemplary embodiment, the color filter may be disposed on the first substrate 400.

The first substrate 400 may further include a pixel electrode P connected to the thin film transistor Tr. The second substrate 200 may further include a common electrode facing the pixel electrode P. Alternatively, the common electrode may be disposed on the first substrate 400.

The backlight assembly 800 is configured to provide the light to the liquid crystal display panel. The backlight assembly 800 may be disposed under the liquid crystal display panel.

The backlight assembly 800 may include a light guiding plate 820, a reflecting plate 840 and a light source 810 generating a light.

At least one of the light sources 810 is disposed at a side portion of the light guiding plate 820 and emits the light to the light guiding plate 820. The light source 810 may be disposed on a first and second sides facing each other or a third and fourth sides facing each other.

For example, the light source 810 may include a cold cathode fluorescent lamp ("CCFL"), an external electrode fluorescent lamp ("EEFL"), a flat fluorescent lamp ("FFL"), a light emitting diode (LED). The light source 810 may be a point light source or a line light source.

The light guiding plate 820 may be configured to receive an incident light having an optical distribution of the point light source or the line light source and provide light having an optical distribution of a plane light source. In other words, the light guiding plate 820 guides the light from the light source 810 to the liquid crystal display panel by changing the optical path of the light from the light source 810. The reflecting plate 840 is disposed under the light guiding plate 820. The reflecting plate 840 reflects the light escaping under the light guiding plate 820 back towards the display panel to improve the optical efficiency.

The optical sheet 830 may be disposed on the backlight assembly 800. The optical sheet 830 may be configured in various ways. For example, the optical sheet 830 may include a protective sheet, a diffusing sheet diffusing the light, and a prism sheet.

The liquid crystal layer 300 may be injected between the first substrate 400 and the second substrate 200. The liquid crystal layer 300 includes liquid crystal molecules with an optical anisotropy. The liquid crystal molecules may be driven by an electric field to pass or block the light to display the image.

The second polarizing element 100 is disposed on the second substrate 200. The second polarizing element 100 is disposed to a user's side with respect to the second substrate 200. The second polarizing element 100 may include an absorptive polarizing element.

For example, the absorptive polarizing element may be manufactured by stretching a polyvinyl alcohol film and absorbing iodine or a dichromatic dye. A transmitting axis Tb of the second polarizing element 100 may be formed perpendicular to a stretching direction of the second polarizing element 100.

The absorptive polarizing element includes a polarizing film including polyvinyl alcohol, and an adhesive A to attach the absorptive polarizing element to the second substrate 200. The adhesive A may include a pressure sensitive adhesive. The adhesive A may be a film shaped layer. The adhesive A attaches the absorptive polarizing element and the second substrate 200 by an external pressure.

The first polarizing element 500 is disposed under the first substrate 400. The optical sheet 830 may be disposed between the first polarizing element 500 and the backlight assembly 800.

Referring to FIG. 3, the first polarizing element 500 includes a reflective polarizing element.

The reflective polarizing element may include accumulated layers of materials having different refractive indexes. The reflective polarizing element may include a second polarizing layer 520 including a birefringent material with anisotropy and a first polarizing layer 510 including an isotropic material, subsequently accumulated.

The first polarizing layer 510 and the second polarizing layer 520 may include dielectric materials having different refractive indexes. Thus, reflective polarizing in various wavelength ranges may be achieved from the difference in thickness and refractive index between the first polarizing layer 510 and the second polarizing layer 520.

Referring to FIGS. 1-3, a transmitting axis Tb of the second polarizing element 100 is substantially perpendicular to a transmitting axis Ta of the first polarizing element 500. A reflecting axis Rb of the second polarizing element 100 is substantially parallel to the transmitting axis Ta of the first polarizing element 500.

A stretching direction x of the first polarizing element 500 is substantially parallel to the transmitting axis Ta of the first polarizing element 500.

When the first polarizing layer 510 is formed by stretching in the stretching direction x, the first polarizing layer 510 has a refractive index $n_1$ in the stretching direction x. The first polarizing layer 510 has the same refractive index $n_1$ in a direction y substantially perpendicular to the stretching direction x. The direction y substantially perpendicular to the stretching direction x may be substantially parallel to a reflecting axis Ra of the first polarizing element 500.

When the second polarizing layer 520 is formed by stretching in the stretching direction x, the second polarizing layer 520 has a refractive index $n_1$ in the stretching direction x. The second polarizing layer 520 may have a refractive index $n_2$, which is less than the refractive index $n_1$, in the direction y substantially perpendicular to the stretching direction x. The second polarizing layer 520 may alternatively have a refractive index $n_2$, which is greater than the refractive index $n_1$, in the direction y substantially perpendicular to the stretching direction x.

Thus, the first polarizing layer 510 and the second polarizing layer 520 may have the same refractive index in the stretching direction x of the first polarizing element 500, and the stretching direction x and the transmitting axis Ta of the first polarizing element 500 are parallel to each other, preventing the liquid crystal display panel from distortion of the display panel.

When light vibrating in a first direction substantially perpendicular to the reflective axis Ra and light vibrating in a second direction not substantially perpendicular to the reflective axis Ra enter first polarizing element 500 from the backlight assembly 800, the first polarizing element 500 only transmits the light vibrating in the first direction and reflects the light vibrating in the second direction.

The second polarizing element 100 is disposed on the second substrate 200. The second polarizing element 100 may include an absorptive polarizing element. When the light passes through the first polarizing element 500 and the liquid crystal layer 300 driven by electric field and enters the second polarizing element 100, the second polarizing element 100 including the absorptive polarizing element only passes the light vibrating in the second direction substantially parallel to the transmitting axis Tb.

The reflective polarizing element only passes the light vibrating in a direction substantially parallel to the transmitting axis Tb and reflects other lights vibrating in a direction other than the transmitting axis Tb. Thus, the reflective polarizing element may polarize substantial amount of the light from the backlight assembly 800, decreasing optical loss and increasing the amount of light transmitted through the reflective polarizing element, thus increasing luminance of the display panel.

Compared to the absorptive polarizing element which absorbs lights vibrating in directions not parallel to the transmitting axis, the reflective polarizing element reflects lights vibrating in directions not parallel to the transmitting axis. Thus, the light reflected by the reflective polarizing element may be recycled, improving the optical efficiency of the liquid crystal display apparatus.

When the light passes through the first polarizing element 500 and the liquid crystal layer 300 driven by electric field and enters the second polarizing element 100, the second polarizing element 100 including the absorptive polarizing element only passes the light vibrating in the second direction substantially parallel to the transmitting axis Tb.

The first polarizing element 500 and the second polarizing element 100 may further include a phase difference layer to change a phase of the light and a protective film. For example, the protective film may include polycarbonate, polystyrene, polyvinyl alcohol, poly methyl methacrylate, polypropylene, polyolefine, polyacrylate or polyamide.

Figure 4:
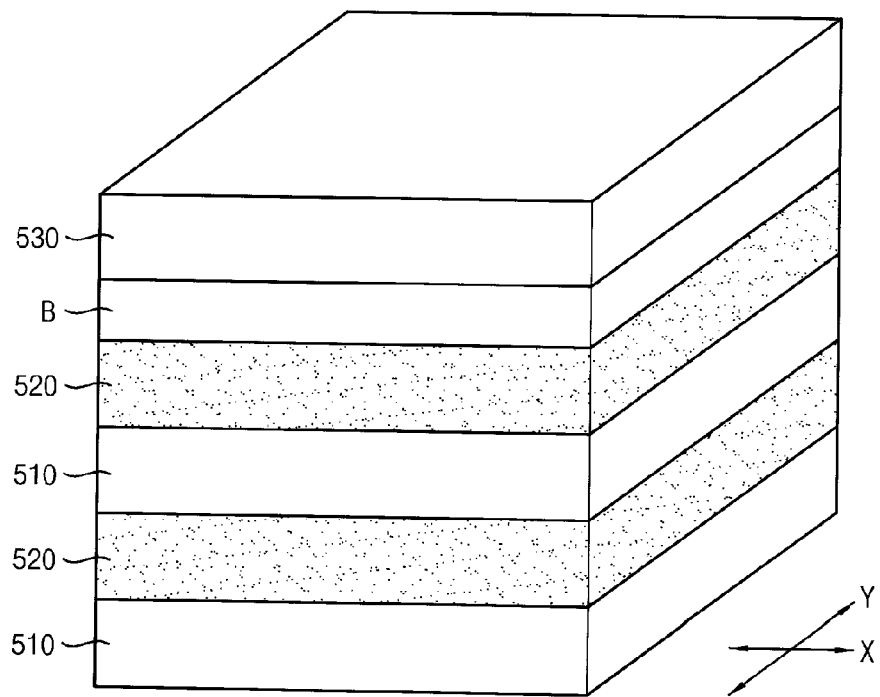
FIG. 4 is a perspective view illustrating a first polarizing element according to an exemplary embodiment of the present invention.

FIG. 4 is a perspective view illustrating a first polarizing element according to an exemplary embodiment of the present invention.

Referring to FIG. 4, the first polarizing element 500a may further include a first absorptive polarizing element 530. The first absorptive polarizing element 530 may have structure and function similar to the absorptive polarizing element of the second polarizing element 100, as previously disclosed. The first absorptive polarizing element 530 is disposed between the second polarizing layer 520 and the first substrate 400. The first absorptive polarizing element 530 may be attached to the second polarizing layer 520 by an adhesive B. The adhesive B attaches the first substrate 400 and the first polarizing element 500a. The adhesive B may include a pressure sensitive adhesive. The adhesive B may be a film shaped layer. The adhesive B attaches the first absorptive polarizing element 530 and the second polarizing layer 520 by an external pressure. Although not shown in figures, the first polarizing element 500a may further include an adhesive attaching the first polarizing element 500a and the first substrate 400.

For example, the adhesive B may include at least one of an acrylic resin, a rubber resin, a urethane resin, a silicon resin and a polyvinyl ether resin. The acrylic resin may include at least one of (metha) acrylic ester polymer such as (metha) acrylic butyl, (metha) acrylic ethyl, (metha) acrylic isooctyl, and (metha) acrylic 2-ethyl hexyl.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims.

What is claimed is:

1. A liquid crystal display panel comprising:
    a first substrate;
    a second substrate facing the first substrate;
    a liquid crystal layer disposed between the first substrate and the second substrate;
    a first polarizing element disposed under the first substrate, the first polarizing element comprising a first polarizing layer and a second polarizing layer having different refractive indexes, the first polarizing layer having been stretched in a direction substantially parallel to a transmitting axis of the first polarizing element; and
a second polarizing element disposed on the second substrate, the second polarizing element having been stretched in a direction substantially perpendicular to a transmitting axis of the second polarizing element.

2. The liquid crystal display panel of claim 1, wherein the first polarizing layer has a refractive index of $n_1$ in the direction of the transmitting axis of the first polarizing element and a refractive index of $n_1$ in a direction of a reflecting axis of the first polarizing element, and
the reflecting axis and the transmitting axis of the first polarizing element are perpendicular to each other.

3. The liquid crystal display panel of claim 2, wherein the second polarizing layer is formed by stretching in a direction of the transmitting axis of the second polarizing element, the second polarizing layer has a refractive index of $n_1$ in the direction of the transmitting axis of the second polarizing element and a refractive index of $n_2$, which is less than the refractive index of $n_1$, in a direction of a reflecting axis of the second polarizing element, and
the reflecting axis and the transmitting axis of the second polarizing element are perpendicular to each other.

4. The liquid crystal display panel of claim 2, wherein the second polarizing layer is formed by stretching in a direction of the transmitting axis of the second polarizing element, the second polarizing layer has a refractive index of $n_1$ in the direction of the transmitting axis of the second polarizing element and a refractive index of $n_2$, which is greater than the refractive index of $n_1$, in a direction of a reflecting axis of the second polarizing element, and
the reflecting axis and the transmitting axis of the second polarizing element are perpendicular to each other.

5. The liquid crystal display panel of claim 1, wherein the transmitting axis of the first polarizing element is substantially perpendicular to a reflecting axis of the first polarizing element, and
the stretching direction of the first polarizing layer is substantially perpendicular to the reflecting axis of the first polarizing element.

6. The liquid crystal display panel of claim 1, wherein the transmitting axis of the second polarizing element is substantially perpendicular to a reflecting axis of the second polarizing element, and
the stretching direction of the second polarizing element is substantially parallel to the reflecting axis of the second polarizing element.

7. The liquid crystal display panel of claim 1, wherein the first polarizing element is a reflective polarizing element, and
the second polarizing element is an absorptive polarizing element.

8. The liquid crystal display panel of claim 7, wherein the absorptive polarizing element comprises:
a polarizing film comprising polyvinyl alcohol; and
an adhesive disposed between the absorptive polarizing element and the second substrate.

9. The liquid crystal display panel of claim 1, wherein the first polarizing element comprises a reflective polarizing element and a first absorptive polarizing element, and
the second polarizing element is a second absorptive polarizing element.

10. The liquid crystal display panel of claim 9, wherein the first absorptive polarizing element is disposed between the reflective polarizing element and the first substrate, and
the second absorptive polarizing element is disposed on the second substrate.

11. The liquid crystal display panel of claim 1, wherein the first polarizing layer comprises an isotropic material, and
the second polarizing layer comprises a birefringent material with anisotropy.

12. A liquid crystal display apparatus comprising:
a liquid crystal display panel comprising:
a first substrate;
a second substrate facing the first substrate;
a liquid crystal layer disposed between the first substrate and the second substrate;
a first polarizing element disposed under the first substrate, the first polarizing element comprising a first polarizing layer and a second polarizing layer having different refractive indexes, the first polarizing layer having been stretched in a direction substantially parallel to a transmitting axis of the first polarizing element; and
a second polarizing element disposed on the second substrate, the second polarizing element having been stretched in a direction substantially perpendicular to a transmitting axis of the second polarizing element; and
a backlight assembly configured to provide a light to the liquid crystal display panel.

13. The liquid crystal display apparatus of claim 12, wherein the first polarizing layer has a refractive index of $n_1$ in the direction of the transmitting axis of the first polarizing element and a refractive index of $n_1$ in a direction of a reflecting axis of the first polarizing element, and
the reflecting axis and the transmitting axis of the first polarizing element are perpendicular to each other.

14. The liquid crystal display apparatus of claim 13, wherein the second polarizing layer is formed by stretching in a direction of the transmitting axis of the second polarizing element, the second polarizing layer has a refractive index of $n_1$ in the direction of the transmitting axis of the second polarizing element and a refractive index of $n_2$, which is less than the refractive index of $n_1$, in a direction of a reflecting axis of the second polarizing element, and
the reflecting axis and the transmitting axis of the second polarizing element are perpendicular to each other.

15. The liquid crystal display apparatus of claim 13, wherein the second polarizing layer is stretched in a direction of the transmitting axis of the second polarizing element, the second polarizing layer has a refractive index of $n_1$ in the direction of the transmitting axis of the second polarizing element and a refractive index of $n_2$, which is greater than the refractive index of $n_1$, in a direction of a reflecting axis of the second polarizing element, and
the reflecting axis and the transmitting axis of the second polarizing element are perpendicular to each other.

16. The liquid crystal display apparatus of claim 12, wherein the transmitting axis of the first polarizing element is substantially perpendicular to a reflecting axis of the first polarizing element, and
the stretching direction of the first polarizing layer is substantially perpendicular to the reflecting axis of the first polarizing element.

17. The liquid crystal display apparatus of claim 12, wherein the transmitting axis of the second polarizing element is substantially perpendicular to a reflecting axis of the second polarizing element, and
the stretching direction of the second polarizing element is substantially parallel to the reflecting axis of the second polarizing element.

18. The liquid crystal display apparatus of claim 12, wherein the first polarizing element is a reflective polarizing element, and the second polarizing element is an absorptive polarizing element.

19. The liquid crystal display apparatus of claim 12, wherein the first polarizing element comprises a reflective polarizing element and a first absorptive polarizing element, and the second polarizing element is a second absorptive polarizing element.

20. The liquid crystal display apparatus of claim 12, wherein the first polarizing layer comprises an isotropic material, and the second polarizing layer comprises a birefringent material with anisotropy.

* * * * *